Jan. 21, 1958 H. C. HEY 2,820,949

BALANCED MODULATOR

Filed May 16, 1955

INVENTOR
H. C. HEY
BY W. L. Keefauver
ATTORNEY 2,820,949

BALANCED MODULATOR

Herman C. Hey, Whippany, N. J., assignor to Bell Telephone Laboratories, Incorporated, New York, N. Y., a corporation of New York Application May 16, 1955, Serial No. 508,500

7 Claims. (Cl. 332—47)

Figure 1:
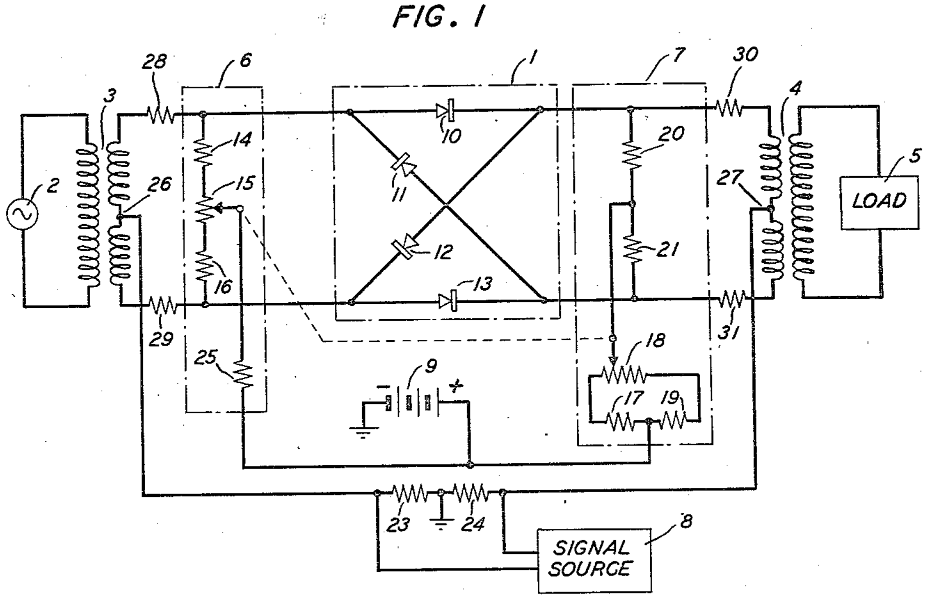

This invention relates primarily to wave modulating systems employing resistance elements having non-linear voltage-current characteristics connected in a lattice arrangement, and particularly to balanced modulators.

One object of this invention is to balance effectively the currents in the various branches of the modulator network due to the inherent unbalance among the circuit elements employed therein.

Another and more particular object is to reduce the transmission of an unmodulated carrier component, i. e. "carrier leak," into the output circuit caused by unbalanced in a so-called balanced type of modulator.

A further object is to reduce the transmission of a signal component directly into the output circuit also caused by a lack of perfect balance between the conducting pairs of elements in a so-called balanced type of modulator.

In accordance with a feature of the present invention the unbalance in values of forward resistance between the successively conducting non-linear resistance pairs composing the lattice is balanced in a novel manner by a direct-current bias applied to opposite sides of the lattice from an external bias source. Since the resistance elements employed in the lattice modulator are non-linear, the forward resistance is dependent on current flowing therethrough. By means of this bias current the respective pairs of non-linear elements can be balanced in resistance value with respect to each other. In United States Patent No. 2,438,948, issued April 6, 1948, to R. R. Riesz, one method of applying direct-current bias to reduce the resistance of non-linear elements in a modulating system and thereby achieve carrier balance is suggested. In the Riesz embodiment, the bias current is introduced by opening up one corner of the bridge network and inserting there a potentiometer, thereby adding additional resistance in series with the bridge elements and consequently reducing the efficiency of the modulator. In accordance with a feature of the present invention, bias currents are introduced in parallel with a lattice network without adding additional resistance in series with the lattice elements.

A specific embodiment of the invention comprises a balanced modulator circuit which includes a ring or lattice of at least four non-linear resistance elements disposed in the respective branches thereof, a carrier-wave source, a signal source, and a load circuit. The signal may be voice modulation or composite television video information. A direct-current signal balance control, comprising ganged potentiometers and associated dropping resistances, is connected into the basic modulator circuit in such a manner as to produce equal current flow in each section of the dual control at all times. One section of the control sets up a voltage across the carrier-wave input side of the modulator lattice, equivalent to an adjustable battery. By variation of this voltage a differential current is caused to flow through the non-linear resistance elements composing the lattice, thereby biasing the conducting pairs of elements into very nearly equal values of forward resistance. Since all the current flowing to ground through this half of the dual control must pass through the signal input circuit, in effect a direct-current signal component is superimposed on the input circuit. A new carrier unbalance which must be conpensated for is produced thereby. The remaining section of the dual control, having its associated resistors properly proportioned, introduces an equivalent current, all of it longitudinal and none of it differential, which also flows through the lattice and the signal input circuit. This latter compensating current then effectively cancels out the additional carrier-wave unbalance produced by the setting of the first section of the dual control. Only the differential current caused to flow through the lattice by the first control is used to establish a signal balance.

It may be pointed out that signal balance could have been achieved without destroying carrier balance by connecting an adjustable battery or other source of potential of correct magnitude and polarity across the carrier input side of the lattice. However, this method of signal balance is undesirable from a practical standpoint as it would leave an ungrounded battery floating across the carrier input side of the lattice. Therefore, circuits employing the present invention, such as the embodiments described herein, are to be preferred.

Figure 2:
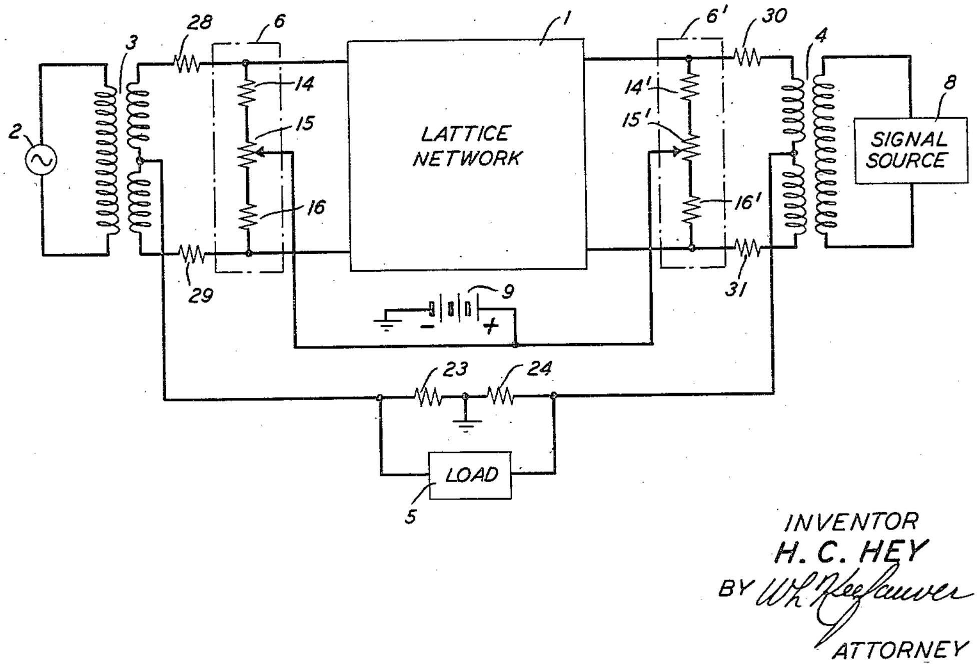

The invention will be more clearly understood from the following detailed description and the accompanying drawings, in which:

Fig. 1 represents a specific embodiment of the invention in a balanced modulator circuit arranged to produce a signal-wave modulated carrier output; and Fig. 2 represents a specific embodiment of the invention in another balanced modulator circuit arranged to demodulate a signal-modulated input wave.

The balanced modulator circuit shown in Fig. 1 is of a well-known type, but modified in accordance with the principle of applicant's invention, to provide new means for adjusting and balancing the system. The basic modulator circuit is described in United States Patent No. 2,025,158, issued December 24, 1935, to F. A. Cowan, and comprises a lattice or ring 1 of four unilaterally conducting elements 10, 11, 12, and 13 disposed in the respective branches thereof, the elements being poled to conduct current in one direction only around the closed ring. Transformers 3 and 4 are employed for carrier-wave input and modulated wave output, respectively. A signal-wave source 8 is also provided. The secondary winding of the input transformer 3 is connected across two terminals of the lattice network 1 and is tapped at an intermediate point 26 to permit attachment of a connection to one terminal of signal source 8. The primary winding of the output transformer 4 is connected between the other pair of lattice network terminals and is divided in a somewhat similar manner to permit attachment of a connection from an intermediate point 27 to the other terminal of signal source 8.

Ideally, a completely modulated wave, with carrier and signal components suppressed, is produced in the secondary winding of the output transformer 4 when current from signal source 8 is introduced into the divided windings of transformers 3 and 4, provided that current from carrier source 2 is flowing in the circuit at the same time. In such a case, no unmodulated carrier or signal reaches the load 5, which is connected to the secondary winding of the output transformer 4. However, such an ideal situation is possible only if the circuit is accurately balanced. Unbalance between conducting pairs of lattice elements permits the transmission of an unmodulated carrier component, known as "carrier leak," and a signal component, thus defeating the purpose of the balanced feature of the basic circuit. Hence, it is highly advantageous to have some means available for regulating the relative current flowing in various parts of the modulator circuit, thus enabling a much higher degree of balance to be obtained. The input and output transformer coils should be balanced, and external networks may be added to improve such coil balance if necessary.

The embodiment of the present invention shown in Fig. 1 includes two dividing networks 6 and 7. Divider 6, comprising potentiometer 15 and equal associated resistors 14 and 16, is connected in parallel with the carrier-wave source input across one pair of terminals of lattice 1. Resistors 28 and 29, chosen approximately equal in value to the forward resistance of one of the non-linear lattice elements are provided in series with the secondary output leads of transformer 3 to prevent short-circuiting the dividing network by the secondary of transformer 3. Connection is also made through voltage-dropping resistor 25 from the adjustable center arm of potentiometer 15 to the positive side of direct-current bias source 9. The compensating network 7 comprises the two equal resistors 20 and 21 serially connected with respect to each other but as a combination in parallel with the output transformer across the other pair of terminals of lattice 1. Resistors 30 and 31, connected in series with the primary leads of transformer 4, are required for the same purpose as resistors 28 and 29. Potentiometer 18 with its equal associated resistors 17 and 19 has its center arm connected to the junction of resistors 20 and 21. This compensating network 7 is connected to the positive side of direct-current bias source 9 at the junction of resistors 17 and 19. For best adjustment of the two dividing networks it is preferred that potentiometers 15 and 18 in the respective networks be of equal resistance and be mechanically ganged. This is indicated in Fig. 1 by the dashed line connecting the adjustable arms of potentiometers 15 and 18.

The operation of the invention in its above application in a modulator circuit is as follows. Assuming perfect balance for the moment in the lattice elements, during the positive half cycle of the carrier wave, lattice elements 10 and 12 will each be conducting, thus permitting signal current to flow through the upper half of the divided primary of output transformer 4. During the negative half cycle of the carrier wave, lattice elements 11 and 13 will be conducting, allowing signal current to flow through the lower half of the divided primary of output transformer 4. With all lattice elements equal in forward resistance there will be no unbalance between the amount of signal current transmitted from the positive and negative half cycles of carrier current. There is thus established in the load 5 an alternating current corresponding to the signal current subjected to reversals at carrier frequency. No carrier or signal wave component is transmitted to the load in the ideal situation, and only sidebands of signal energy appear in the load. However, if any degree of unbalance exists between the pairs of alternately conducting lattice elements, then a component at signal frequency will be directly transmitted to the load 5.

By installing the dividing network 6 in the carrier-wave input side of the lattice, potentiometer 15 may be adjusted to set up a voltage across that side of the lattice. A differential current may then be caused to flow through the conducting lattice elements to balance the forward resistances of the conducting pairs of lattice elements. Consequently, signal current unbalance will be reduced to a minimum.

The differential currents produced by the setting of potentiometer 15, however, must flow to ground, i. e., the negative side of bias source 9. The path to ground is divided between resistors 28 and 29 and the secondary of transformer 3 and connection 26 thereon to one side of signal source 8 and through the lattice elements, resistors 30 and 31, and the primary of transformer 4 to the other side of the signal source. This in turn produces an unbalance in the signal input circuit, equivalent to a direct-current signal component, which would cause additional carrier unbalance. For this reason dividing network 7 must be provided to furnish a compensating current through the lattice and the signal source connection to the modulator circuit. The distribution of the currents flowing to ground, through each lead of the signal source, established by networks 6 and 7 is such as to produce effective cancellation of these currents in the signal leads. If potentiometer 18 and associated resistors 17 and 19 in network 7 are chosen equal to corresponding elements 15, 14, and 16 in network 6, and resistors 20 and 21 in network 7 are equal to each other, but twice as large as resistor 25, and if the adjustable center arms of potentiometers 15 and 18 are mechanically ganged, the various currents in the return paths to ground from the bias source 9 through the respective dividing networks and each side of the signal source can be cancelled by being made substantially identical in magnitude and opposite in direction of flow at all settings of the adjustable center arms. Thus, the unbalance in the signal circuit that would result from the action of network 6 alone is compensated for, and "carrier leak" is minimized. Resistors 20 and 21 in network 7 connected across the output side of the lattice are chosen identical to furnish a current path for the compensating current to ground without changing the relative direct-current potentials at the output sides of the lattice network. Resistors 23 and 24, connected across the signal input, provide a direct-current path to ground for the balance currents and also balance the signal input circuit to ground.

Although perfect rectification by the lattice elements is desirable, it is not necessary. Since most rectifiers are merely asymmetrical conducting elements, i. e., elements that conduct current in one direction better than in the other, perfect or near perfect rectification is not always attainable. The invention may be used to advantage in circuits employing various kinds of unilaterally conducting devices. The more perfect the rectification, however, the more precise is the balance attainable with the invention.

Similarly, the invention is applicable to circuits employing point contact crystal-type rectifiers which have low values of shunt capacitance. The feature of low shunt capacitance enables a high degree of balance to be obtained on an amplitude basis only, instead of a combination of amplitude and phase. This invention is not limited to circuits employing such rectifiers, though its advantages are greatest with such use.

A variation of the circuit described above to which this invention may be applied is shown in Fig. 2, which represents a circuit for demodulating a signal-modulated carrier wave. In Fig. 2 the lattice modulator 1 is identical to that in Fig. 1. A carrier-wave source 2 is applied to input transformer 3, having a divided secondary winding, as in Fig. 1. However the signal-wave source 8, in this case a signal-modulated carrier wave, applied through a transformer 4, having a divided secondary winding, occupies the position taken in Fig. 1 by the load circuit 5. Similarly, the load circuit 5 appears in Fig. 2 connected between the center-taps of the divided secondary windings of input transformers 3 and 4, in the position occupied by the signal source in Fig. 1. In the demodulator circuit of Fig. 2 the balancing networks 6 and 6' are identical to each other and to network 6 in Fig. 1. No compensating network arrangement is required as in the modulator circuit of Fig. 1, because it is only necessary to balance out carrier and signal components from the load and not longitudinally between signal and carrier sources. Direct-current bias source 9 in Fig. 2 is identical to that in Fig. 1. Each of the dividing networks 6 and 6' functions in the same manner as network 6 in Fig. 1. Each of networks 6 and 6' is adjusted independently to balance out by its resultant differential currents the unbalances between the lattice elements that give rise to carrier and signal wave components respectively in the load circuit. Resistors 23 and 24, connected to a ground point across the load circuit 5, provide a return path to ground for the balance currents when the demodulator output is unterminated. Resistors 28, 29, 30, and 31 perform the same function of preventing short-circuiting of the balance networks by the transformer windings in Fig. 2 as in Fig. 1.

It is to be pointed out that this invention is not restricted to use in the specific embodiments of Figs. 1 and 2. It is equally applicable to balanced modulators employing input and output circuits comprising divided impedances, other than the transformers described herein. Likewise, the invention is susceptible of application in various other embodiments within the spirit and scope of the appended claims.

I claim:

1. In combination with a wave translating lattice comprising four asymmetrically conducting elements disposed in pairs for opposite directions of transmission in each of two opposite diagonals thereof, a source of carrier current, a source of signal current, a load circuit, and means for coupling said carrier and signal sources and said load circuit to said two lattice diagonals in such manner that said carrier and signal sources are in conjugate relation to said load circuit, means for substantially reducing the transmission of current from said carrier and signal sources directly into said load circuit, comprising a source of direct current, and resistance means for connecting said direct-current source to said two lattice diagonals, said last-mentioned means being adjustable to provide different amounts of current flow in the respective element pairs of one of said two lattice diagonals to balance the forward resistance of the last-mentioned element pairs for the transmission of signal current in said lattice, said last-mentioned means being further adjustable to control the direct current flow in the respective element pairs of the other of said two lattice diagonals to balance the forward resistance of the last-mentioned element pairs for the transmission of carrier current in said lattice.

2. The combination according to claim 1 in which said adjustable resistance means comprises a first potentiometer network connected in shunt of said one lattice diagonal and having a contact adjustable along a midsection thereof, said adjustable contact is connected to one terminal of said direct-current source, and a resistance network connected in shunt of said other lattice diagonal and a second potentiometer network having an adjustable contact and a fixed contact, said last-mentioned adjustable contact is connected to the midpoint of said resistance network and said fixed contact is connected to said one terminal of said direct-current source, and means for mechanically connecting said two adjustable contacts together whereby the amounts of direct current flowing in the respective resistance element pairs of said one and other lattice diagonals are simultaneously changed.

3. The combination according to claim 1 in which said adjustable resistance means comprise a pair of potentiometer resistance means each including an adjustable arm, a first of said potentiometer means is connected in shunt of said one lattice diagonal to provide the different amounts of current flow in the respective element pairs of said one lattice diagonal, a second of said potentiometer means is connected in shunt of said other lattice diagonal to provide different amounts of current flow in the respective element pairs of said other lattice diagonal, and said adjustable arms of said pair of potentiometer resistance means are connected to one terminal of said direct-current source.

4. In combination with a wave translating network comprising four asymmetrically conducting elements arranged in series in a ring, said ring network including two elements poled in one conductive direction on one side of each of two diagonals of said ring network and two elements poled in an opposite conductive direction on the other side of each of said two ring network diagonals, a first transformer having a primary winding and a divided secondary winding, said last-mentioned winding being connected to one of said two ring network diagonals, a source of carrier current connected to said first-mentioned primary winding, a second transformer having a divided primary winding and a secondary winding, said last-mentioned primary winding being connected to the other of said two ring network diagonals, a load connected to said last-mentioned secondary winding, a source of signal current connected to midpoints of both said divided secondary and primary windings, means for minimizing signal and carrier current leak into said load circuit, comprising a source of direct current, means for connecting said last-mentioned source to said one and other ring network diagonals, and means included in said last-mentioned connecting means for controlling the amounts of direct current supplied by said last-mentioned source to said one and other ring network diagonals, said control means including a first current dividing network connected across said one ring network diagonal and having an adjustable arm connected to one terminal of said direct-current source for differentially controlling the amounts of direct current supplied to the oppositely poled elements on the respective sides of said one ring network diagonal and thereby balancing the last-mentioned elements for the transmission of signal current in said ring network, said first current dividing network introducing a first direct-current flow in said signal source connected thereto thereby tending to unbalance said ring network to permit carrier current to leak into said load circuit, a second current dividing network connected to said other ring network diagonal and including an adjustable arm connected to said one terminal of said direct-current source for controlling in equal amounts the direct current supplied to said divided primary winding and the oppositely poled elements on the respective sides of said other ring network diagonal connected thereto, said second current dividing network establishing a second direct-current flow in said signal source in such amount and direction as to cancel said first direct-current flow in said signal source thereby balancing last-mentioned elements for the transmission of carrier current in said ring network, and means for mechanically connecting both said adjustable arms together to control simultaneously the amounts of direct current supplied to the oppositely poled elements composing the respective sides of each of said one and other ring network diagonals.

5. In combination, a wave translating network comprising four unilaterally conducting elements poled to form a continuous current path in one direction between two opposite diagonals, a source of carrier current, a source of signal current, a load circuit balanced to ground, a pair of transformers one having a primary winding and a divided secondary winding and the other a divided primary winding and a secondary winding, circuit connections from midpoints of both said divided windings to said load circuit, said divided secondary winding being connected to one of said two network diagonals while said divided primary winding is connected to the other of said two network diagonals, said carrier and signal sources being connected to said primary and secondary windings respectively, and means for reducing carrier and signal current transmission directly into said load circuit, comprising at least two current-dividing networks connected to said network diagonals in parallel with the respective divided secondary and primary windings, each of said dividing networks having an adjustable arm, a source of direct current having a positive terminal and a ground terminal, said adjustable current-dividing network connected to said one ring network diagonal to which said divided secondary winding and carrier sources are connected serving to provide different amounts of direct-current flow in the elements connected in the same conductive direction in said last-mentioned diagonal, said adjustable current-dividing network connected to said other ring network diagonal to which said divided primary winding and signal source are connected serving to provide different amounts of direct-current flow in the elements connected in the same conductive direction in the last-mentioned diagonal, and means for connecting the positive terminal of said direct-current source to both said adjustable arms so that direct current from said last-mentioned source flows from said positive terminal and through said two current-dividing networks, the respective divided secondary and primary windings, said balanced load circuit and finally to said ground terminal.

6. In a balanced modulator circuit, four non-linear resistance elements disposed in one conductive direction in a ring, a source of carrier waves, a load circuit, a pair of inductive means each including divided windings, one of said inductive means connecting said carrier source to one ring diagonal and the other inductive means connecting said load circuit to the other ring diagonal, a source of signal waves balanced to ground and connected to midpoints of said pair of divided inductive windings, means for substantially balancing said modulator ring for signal and carrier waves, comprising a source of direct current having a positive terminal and a grounded negative terminal, a first current-dividing network having an adjustable arm connected to said positive terminal and connecting said direct-current source in parallel with said one inductive means and said one ring diagonal, said first current-dividing network causing direct current to flow in different amounts through the respective non-linear resistance elements poled in opposite conductive directions in said one ring diagonal thereby tending to balance said modulator ring for signal current but also causing direct current to flow in one direction in said signal source to unbalance said modulator ring for carrier current, and means for substantially balancing said modulator ring for carrier current, comprising a second current-dividing network including a pair of serially connected equal resistances connected in parallel with said other divided inductive means and said other ring diagonal, a resistance network having an adjustable arm and a fixed contact, said last-mentioned adjustable arm being connected to a common point on said pair of equal resistances and said fixed contact being connected to said positive terminal, said second current-dividing network causing the direct current to flow in equal amounts through the respective resistance elements poled in opposite conductive directions in said other ring diagonal and thereby in said signal source in such amount and direction as to cancel the first-mentioned direct-current flow therein for balancing said modulator ring for carrier current, and means for mechanically connecting the adjustable arms of both said first and second current-dividing networks together for simultaneously adjusting the amounts of direct current flowing in the respective resistance elements of said one and other diagonals of said ring.

7. In combination with a wave translating network comprising four asymmetrical conducting elements disposed in pairs for opposite conductive directions of transmission in each of two opposite diagonals thereof, a source of carrier current, a source of signaling current, a load, and means for coupling said carrier and signal sources and said load to said two opposite network diagonals whereby said carrier and signal sources are in conjugate relation to said load, and means to balance the forward resistance of the respective element pairs in said two network diagonals for substantially precluding a transmission of carrier and signaling current into said load, comprising a source of direct current, and two adjustable resistances for connecting said direct-current source to said coupling means and said two network diagonals, one of said two resistances being adjustable to cause different amounts of direct current to flow in opposite directions in the respective element pairs in one of said two network diagonals thereby balancing the forward resistance of said last-mentioned element pairs for signaling current, said one adjustable resistance tending to introduce a flow of direct current into said coupling means to unbalance said network for carrier current, and a second of said two resistances being adjustable to vary the amount of direct current flowing in the respective element pairs in the opposite network diagonal and thereby tending to establish a direct-current flow in said coupling means in such amount and direction as to cancel the first-mentioned direct-current flow therein for balancing said network for carrier current.

References Cited in the file of this patent

UNITED STATES PATENTS

| | | |
|---|---|---|
| 2,233,860 | Wise | Mar. 4, 1941 |

FOREIGN PATENTS

| | | |
|---|---|---|
| 604,803 | Great Britain | July 9, 1948 |